(12) United States Patent
Vogel et al.

(10) Patent No.: US 8,825,632 B2
(45) Date of Patent: Sep. 2, 2014

(54) METHOD OF INTERROGATING A DATABASE AND INTERROGATION DEVICE

(76) Inventors: Marc Vogel, Vaucresson (FR); Dan Vogel, Vaucresson (FR)

( * ) Notice: Subject to any disclaimer, the term of this patent is extended or adjusted under 35 U.S.C. 154(b) by 546 days.

(21) Appl. No.: 12/677,575

(22) PCT Filed: Sep. 11, 2008

(86) PCT No.: PCT/FR2008/051626
§ 371 (c)(1),
(2), (4) Date: Jul. 22, 2010

(87) PCT Pub. No.: WO2009/044086
PCT Pub. Date: Apr. 9, 2009

(65) Prior Publication Data
US 2010/0287157 A1 Nov. 11, 2010

(30) Foreign Application Priority Data

Sep. 11, 2007 (FR) ...................... 07 57494

(51) Int. Cl.
*G06F 7/00* (2006.01)
*G06F 17/30* (2006.01)
(52) U.S. Cl.
CPC ............................... *G06F 17/30392* (2013.01)
USPC ............................ 707/714; 707/694; 711/149

(58) Field of Classification Search
USPC .......................................... 715/780; 711/149
See application file for complete search history.

(56) References Cited

U.S. PATENT DOCUMENTS

| 5,519,859 | A | 5/1996 | Grace |
| 5,895,465 | A | 4/1999 | Guha |
| 2002/0184225 | A1 | 12/2002 | Ghukasyan |
| 2004/0010507 | A1 * | 1/2004 | Bellew .......................... 707/102 |

* cited by examiner

*Primary Examiner* — Alex Gofman
*Assistant Examiner* — Tuan-Khanh Phan
(74) *Attorney, Agent, or Firm* — Young & Thompson

(57) ABSTRACT

A method of interrogation or modification of a database having a plurality of tables each with fields and relationships between the fields of various tables, the method including: filling in a single privileged table; filling in at least one field in another table for which data are sought or to be modified; filling in at least one filter pertaining to a field of another table allowing the selection of the data sought or to be modified; identifying in the database, using the input fields and the fields appearing in the input filters, the tables containing these fields; identifying in the database, using the input fields and the fields appearing in the input filters, the relationships between these fields of various tables; reformulating a query to the database by stating in full the fields, the identified tables, joins representative; and applying the query to the database.

12 Claims, 2 Drawing Sheets

METHOD OF INTERROGATING A DATABASE AND INTERROGATION DEVICE

The present application is the U.S. National Phase of International Patent Application Serial No. PCT/FR2008/051626, filed on Sep. 11, 2008, which claims the benefit of French Patent Application Serial No. 0757494, filed on Sep. 11, 2007, both of which are hereby incorporated by reference in their entireties.

The present invention relates to a method of interrogating or modifying a database.

BACKGROUND OF THE INVENTION

These days, databases are used to store a very large amount of data originating from many sources. It is known that these data are stored in tables each comprising several fields, these tables being defined by the data model. Relationships are established between the fields of various tables and recorded in the database.

To obtain the data sought in a database, using a query language for interrogating the database is known. Thus, by using a query the content of some fields in some tables can be obtained, according to predetermined criteria which are commonly defined in filters.

SQL is a commonly used language for interrogating a database. The syntax of this language allows data from many sources to be retrieved, filtered and recompiled according to search criteria and relationships between the tables, particularly to order said data in a two-dimensional array.

SQL comprises multiple keywords to, perform one or more of these actions for the same query.

It is an extremely powerful language but its use is limited to experienced users with a very good command of the language. In particular, to formulate a query using SQL, the fields for which data are sought, the tables containing these fields, the filters used and the relationships between the tables containing the various fields, as defined in the database, must be specified.

SUMMARY OF THE INVENTION

Using these queries is awkward and the object of the invention is to propose a method and means of querying a database so as to access the data contained in the database more easily.

Accordingly, the object of the invention is a method of interrogating or modifying a database comprising:
a plurality of tables each with fields, and
relationships between the fields of various tables,
the method comprising the steps of:
1) filling in a single privileged table;
2) filling in at least one field in another table for which data are sought or to be modified;
AND/OR
2') filling in at least one filter pertaining to a field of another table allowing the selection of the data sought or to be modified;
3) identifying in the database, using the input fields and the fields appearing in the input filters, the tables containing these fields;
4) identifying in the database, using the input fields and the fields appearing in the input filters, the relationships between these fields of various tables;
5) reformulating a query to the database by stating in full:
the fields for which data are sought or to be modified,
the identified tables containing input fields and/or fields appearing in the filter,
joins representative of relationships between the fields of various tables
6) applying the query to the database.

Using particular implementation modes, the method comprises one or more of the following characteristics:
the input of filters for selecting the data sought does not include the explicit mention of the joins representative of the relationships between the fields of various tables,
the query is reformulated in SQL,
the relationship to another table is implicitly input in a filter by using the name of a field used by the join in the case of a "many to one" relationship,
to designate the fields in a table other than the input table, the relationship to another table is input in the filter using a formulation containing the form: sourcefield.destinationfield where sourcefield is the field in the source table and destinationfield is the field in the destination table in the case of a "many to one" relationship,
the relationship to another table is input in the filter using a name previously assigned to the relationship in the database data model in the case of a "one to many" relationship,
the nested filtering conditions are input as filter variables identified by predetermined syntax ({.}), but the variable does not explicitly mention the joins representative of the relationships between the fields of the various tables,
the filter comprises at least one field comparison operator which may be combined by AND/OR operators.

The invention also relates to an installation for interrogation or modification of a database comprising a database that has:
a plurality of tables each with fields, and
relationships between the fields of various tables,
the installation comprising:
1) means of filling in a single privileged table;
2) means of filling in at least one field in another table for which data are sought or to be modified;
AND/OR
2') means of filling in at least one filter pertaining to a field of another table allowing the selection of the data sought or to be modified;
3) means of identifying in the database, using the input fields and the fields appearing in the input filters, the tables containing these fields;
4) means of identifying in the database, using the input fields and the fields appearing in the input filters, the relationships between these fields of various tables;
5) means of reformulating a query to the database by stating in full:
the fields for which data are sought or to be modified,
the identified tables containing input fields and/or fields appearing in the filter,
joins representative of relationships between the fields of various tables
6) means of applying the query to the database.

BRIEF DESCRIPTION OF THE DRAWINGS

The invention will be better understood on reading the description that follows, given by way of example only, and with reference to the drawings, in which:

FIG. 1 shows a database interrogation device 10 comprising a database 12 and database interrogation means 14. These interrogation means consist of a computer using suitable computer applications for example.

DETAILED DESCRIPTION OF THE PREFERRED EMBODIMENTS

Figure 1:
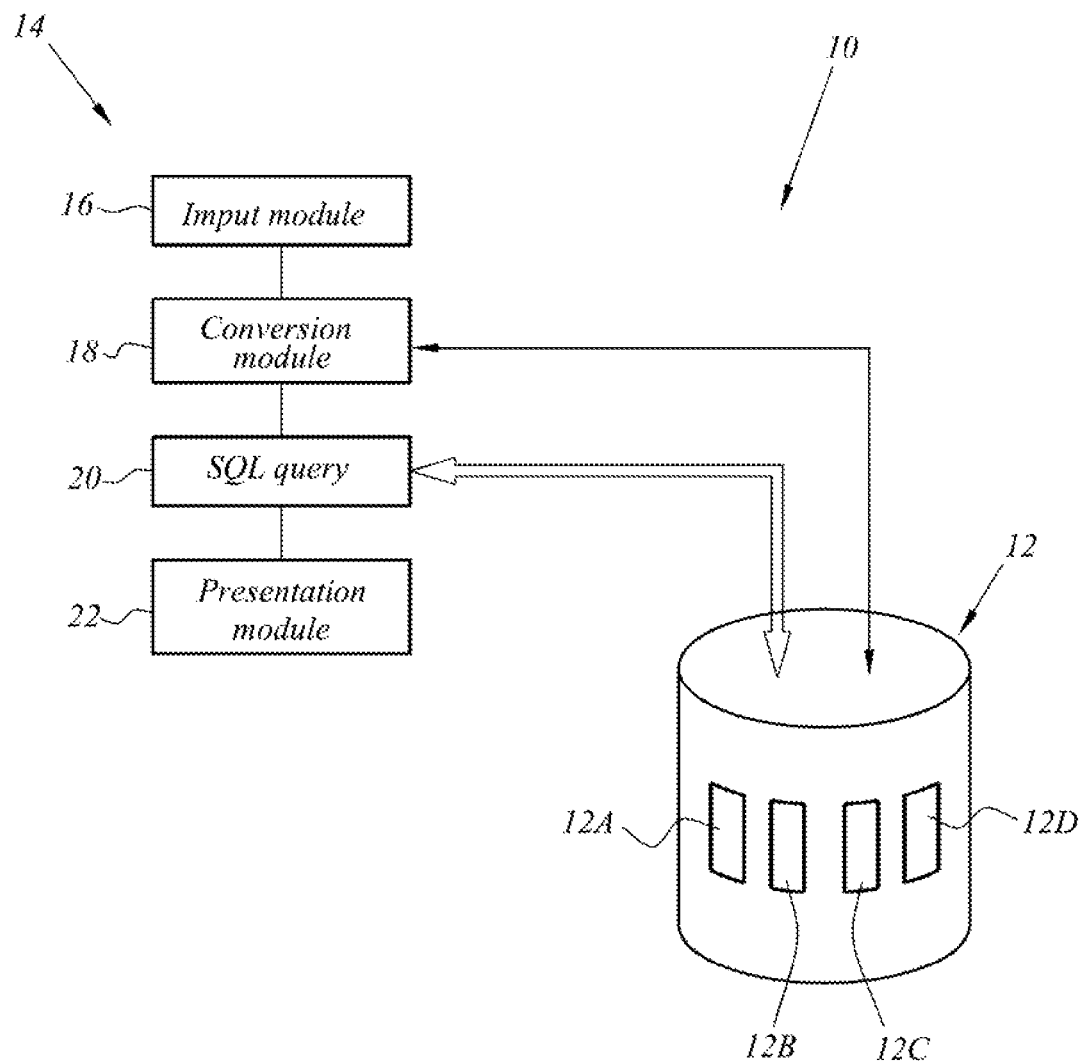
FIG. 1 is a diagrammatic view of a database management installation according to the invention.

In particular, the interrogation means comprise an input module 16 consisting for example of a keyboard and a query editor for formulating queries using a predefined format.

Interrogation may also be carried out without human intervention when executing a computer program.

They also comprise a conversion module 18 connected to the input module to receive the queries formulated. The conversion module 18 is connected to the database 12 by a connection which in particular allows the conversion module knowledge of the relationships between the fields of the various tables in the database, as those relationships are defined in the data model.

The conversion means 18 are suitable for retranscribing an initial query input from the module 14 in an initial format as a full SQL query in an appropriate SQL format taking account of the content of the initial query and the relationships contained in the database between the fields of the various tables of the database.

The interrogation means 14 comprise a program module 20 for interrogating the database from SOL queries. This module is referred to as the SOL querymaker. It is suitable for receiving queries formulated in SOL format from the conversion module 18 and retrieving the data corresponding to the queries from the database 12.

Finally, the means 14 comprise a module 22 for making available the data collected in response to the SQL queries formulated. This may be for example a computer display screen or means of saving the data retrieved.

As is known per se, the database 12 comprises a set of tables 12A, 126, 12C, 12D, being for example four in number. Each table comprises a set of fields. Some fields from various tables are connected to one another by relationships commonly known as "joins".

The four tables are, for example, "Customers", "Companies", "Products" and "Purchases".

Figure 2:
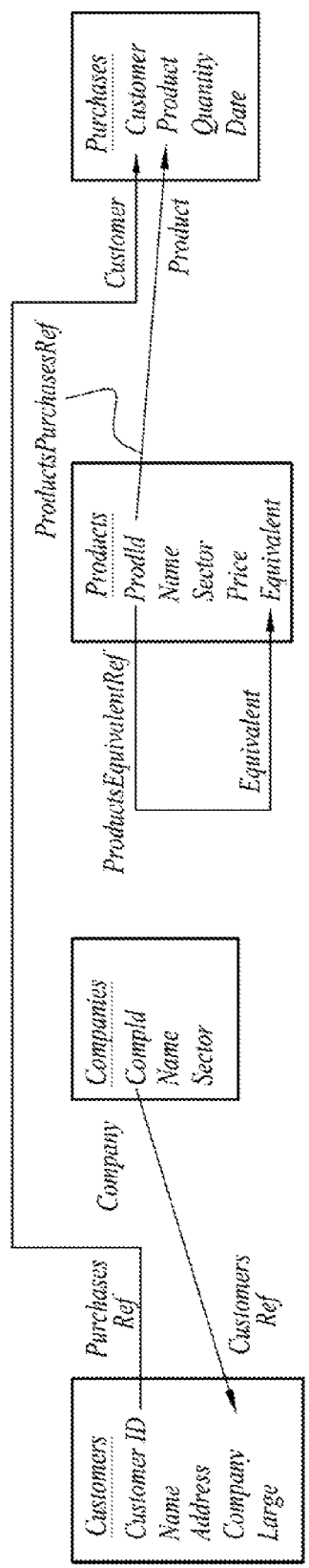
FIG. 2 is a flowchart of the interrogation method used.

The four tables contain the fields shown below, as illustrated in FIG. 2

Customers Table:
CustomerId: customer identifier and key of the table
Name: customer name
Address: company address
Company: reference to the identifier marked CompId of the company to which the customer belongs, this identifier being the first field in the Companies table.
Large: contains Yes or No depending on the size of the customer
    Companies Table:
CompId: company identifier and key of the table
Name: company name
Sector: company activity sector (for example Construction or Information Technology).
    Products Table Showing a List of Products
ProdId: product identifier and key for the table
Name: product name
Sector: activity sector for which this product is intended
Price: product price
Equivalent: reference to another equivalent product to this product marked ProdId
    Purchases Table Containing the List of Purchases Made by a Customer.
Customer: reference to the customer marked CustomerId
Product: reference to the product purchased marked ProdId
Quantity: number of products purchased
Date: date of purchase.

In the example considered, the following relationships have been defined between the fields of the tables. These relationships can be established by searching the data model for the database. The relationships are named so that they can be explicitly referenced. Thus, in the rest of this document when reference is made to the relationship starting from its unique value (primary key) and going to its multiple value (foreign key) the name of the relationship is referred to as stated in the database when the relationship was created. Conversely, to describe the relationship in the multiple value to unique value direction, reference is made to the name of the source field, to simplify the entries because in this case there can be no ambiguity.

There are four relationships and they are defined below:

The Company field of the Customers table and the CompId field of the Companies table constitute a relationship (many to one): this relationship is named CustomersRef when starting from the Companies table and the entry Company (like the field) is used when starting from the Customers table.

The Customer field of the Purchases table and the CustomerId field of the Customers table constitute a relationship (many to one): this relationship is named PurchasesRef starting from the Customers table and the entry Customer (like the field) is used when starting from the Purchases table.

The Product field of the Purchases table and the ProdId field of the Products table constitute a relationship (many to one): this relationship is named ProductsPurchasesRef when starting from the Products table and the entry Product (like the field) is used when starting from the Purchases table.

The Equivalent field of the Products table and the ProdId field of the Products table constitute a relationship (many to one): this relationship is named ProductsEquivalentRef when starting from the Products table and the entry Equivalent (like the field) is used when starting from the Equivalent field.

According to the invention, the input module 16 is such that for each interrogation three types of interrogation variable must be filled in, specifically: Table, Field, Filter.

The first type of variable "Table" is a privileged table in the database. It is essential that it be defined. This table is unique although it may change for each interrogation. Even if the interrogation is aimed at retrieving data from several tables, only one privileged table is input in the input module. It should be noted that this privileged table may be implicit and it is not always necessary to fill it in as it can be deduced from the context. In fact, it may be that a person or program searching the data in a table may wish to use the method described in this invention to reduce the amount of information searched.

The second type of interrogation variable "Fields" consists of the fields for which data are sought. These fields may be fields of the privileged table or fields of other tables in the database, even if they are not part of the privileged table input previously.

Finally, the third type of interrogation variable "Filter" consists of a filter defining the conditions the data in the predefined fields must satisfy if they are to be returned in response to the query.

Neither the joins representative of the relationships between the fields of the tables used to retrieve data nor the tables other than the privileged table from which the data are to be retrieved by the query, appear among the interrogation variables.

The conversion module 18 is such that by analysing only the interrogation variables input from the input module 16 and from knowledge by the conversion module 18 of the data model giving the relationships between the fields of tables, the "joins" fields representative of the relationships between the fields of the tables are established by the conversion module 18 and are reintroduced in the SQL queries sent subsequently to the SQL querymaker 20. Similarly, the tables, other than the privileged table, from which the data are to be retrieved are also established and reintroduced in the SQL queries.

If there is no relationship between the fields of the tables that are to be interrogated, the conversion module 18 only converts the three types of interrogation variable into a query using SQL query syntax of predetermined format in the form:

SELECT data fields sought FROM tables where the fields are present WHERE joins+conditions For example, in the following cases, the conversion module 18 converts the input query into an SQL query in the form detailed below.

To return the Names and Addresses of customers of the company "MyCompany":

Input query

Table: Customers,
Fields: Name, Address
Filter: Company = "MyCompany"
   SQL query SELECT Name, Address FROM Customers WHERE Company = "MyCompany"

Where only one table is searched and therefore no relationship is exploited, the usefulness of the input and conversion is not yet apparent.

Moreover, for a "many to one" relationship, the input module 16 is able to receive an expression made up of the field of the source table marked "sourcefield" and a field of the destination table marked "destinationfield" in the form "sourcefield.destinationfield". The conversion module 18 is able to explicitly indicate the corresponding join from knowledge of the data model when it detects a form of the type "sourcefield.destinationfield" in an input query.

To return Names and Addresses of customers and the activity sector of the corresponding companies:

Input query
Table: Customers
Fields: Name, Address, Company. Sector
Filter: None
   SQL query
   SELECT Customers.Name, Customers.Address, Companies.Sector
FROM Customers, Companies WHERE Customers.Company = Companies.CompId To return the Name and Address of customers of companies in the construction sector:

Input query

Table: Customers
Fields: Name, Address
Filter: Company.Sector = "Construction"
   SQL query SELECT Customers.Name, Customers.Address FROM Customers, Companies WHERE Customers.Company = Companies.CompId AND Companies.Sector = "Construction"

Because the relationship between the Companies and Customers tables is known, it is not necessary to make explicit reference to the join between these tables and the conversion module 18 adds the join "Customers.Company=Companies.CompId" because of its knowledge of the relationship from the data model and its knowledge of the use of the secondary Companies table because of the presence in the filter of the term "Company.Sector".

SQL allows the conditions used to include nested conditions if the conditions indicated after the WHERE operation comprise at least one SELECT operator.

The input module 16 and the conversion module 18 comprise combined means of taking these specificities into account.

More precisely, the format required by the input module provides for a secondary filter defining a condition nested in another condition to be defined in the form of a filter written between two brackets {.}.

When it detects a secondary filter of this type, the conversion module 18 reformulates the condition using the SELECT operator in the condition indicated after the WHERE, SELECT operation, in the condition indicated after the WHERE operation identifying and reporting in the SQL query the tables, other than the privileged table, required for the interrogation and the relationships between the fields of the tables concerned.

In addition, the input module 16 is capable of receiving the explicit name given to a relationship between two tables. The conversion module 18 is capable of explicitly indicating the corresponding join from its knowledge of the data model when it detects the explicit name of a relationship in an input query.

Thus, the name of the relationship is used in the case of a one to many relationship.

To return the Names of customers who have made at least two purchases in which the price of each of the corresponding products is greater than 100:

Input query

Table: Customers
Fields: Name
Filter: PurchasesRef.Count {Product.Price >= 100} >= 2
   SQL query SELECT Name FROM Customers WHERE (SELECT Count(*) FROM Purchases, Products WHERE Purchases.Product = Products.ProdId AND Products.Price >= 100 AND Customer = Customers.CustomerId) >= 2.

A secondary filter is input in the form { }. It relates to the Purchases table and allows the accounting method for the purchases to be specified.

The name of the PurchasesRef relationship is present in the input query, which causes the conversion module 18 to add the "Purchases" table and the condition "Customer=Customers.CustomerId" in the SQL query.

To return the Names and Addresses of customers who have made at least one purchase consisting of at least two specimens of a product the price of which is greater than 100:

| Input query |
| --- |
| Table: Customers<br>Fields: Name, Address<br>Filter: PurchasesRef.Quantity.Min {Product.Price > 100} >=2<br>   SQL query<br><br>SELECT Customers.Name, Customers.Address FROM Customers<br>WHERE (SELECT Min(Purchases.Quantity) FROM Purchases,<br>Products WHERE Purchases.Product = Products.ProdId<br>AND Products.Price > 100 AND Purchases.Customer =<br>Customers.CustomerId) >= 2 |

This example illustrates the ability to specify the field affected by the calculation in the secondary table, in this case "Quantity", and the type of calculation required (here "minimum").

To return the Name and Address of customers who have made at least two product purchases in which the price is greater than 100 and for which the company sector is construction:

| Input query |
| --- |
| Table: Customers<br>Fields: Name, Address<br>Filter: PurchasesRef.Count{Product.Price >= 100} >=2 AND<br>  Company.Sector =<br>"Construction".<br>   SQL query<br>   SELECT Customers.Name, Customers.Address FROM Customers<br>WHERE (SELECT Count(*) FROM Purchases, Products WHERE<br>Purchases.Product = Products.ProdId AND Products.Price >=<br>100 AND Purchases.Customer = Customers.CustomerId) >= 2<br>AND Company IN (SELECT CompId FROM Companies WHERE<br>Sector = "Construction") |

As illustrated in the example below it is also possible to generalise the "sourcefield.destinationfield" syntax to "sourcefield.destinationfield1 . . . destinationfield(x)" where destinationfield(x) is a field in the destination table of the destinationfield(x-1) field and thus either retrieve fields or apply the filter to fields not immediately linked to the privileged table.

Thus, to return the list of purchases together with the name of the corresponding customers and the quantities purchased for all purchases where the company of the customer is in the construction sector:

| Input query |
| --- |
| Table: Purchases<br>Fields: Product, Customer.Name, Sum(Quantity)<br>Filter: Customer.Company.Sector = "Construction".<br>   SQL query<br><br>SELECT Purchases.Product, Customers.Name, Sum(Purchases.Quantity)<br>FROM Purchases, Customers, Companies WHERE Purchases.Customer =<br>Customers.CustomerId AND Customers.Company = Companies.CompId<br>AND Companies.Sector = "Construction" |

Therefore the syntax shown in the example above may also be generalised to include references to the names of "multiple value to multiple value" relationships.

Thus to return a list of people belonging to companies in the construction sector where at least two customers have made purchases of four products worth more than 100:

| Input query |
| --- |
| Table: Customer<br>Fields: Name<br>Filter: Company.CustomersRef.Count{PurchasesRef.Count{Quantity >=<br>4 AND Product.Price >= 100} >= 2} AND Company.Sector =<br>"Construction".<br>   SQL query<br><br>SELECT Name FROM Customers, Companies WHERE<br>Customers.Company = Companies.CompanyId AND (SELECT Count(*)<br>From Customers AS Customers2 WHERE Companies.CompanyId =<br>Customers2.Company AND (SELECT CustomerId FROM Purchases,<br>Products WHERE Purchases.Customer = Customers2.CustomerId AND<br>Purchases.Quantity > 4 AND Products.Price >= 100 AND<br>Products.ProductId = Purchases.Product) >= 2) AND<br>Companies.Sector = "Construction"). |

It will be noted that the language is simplified in the WHERE part of the SQL query and that it is even greater when multiple sub-queries or joins have to be written in SQL.

It will therefore be understood that simplification of the input and interrogation of the database arises from the following two points:

One table alone is selected as the privileged table. The entries and meanings of all the expressions are therefore simplified and interpreted using this principle and the tables not explicitly indicated are searched in the database through knowledge of the data model and the relationships it contains, allowing the conversion module to reintegrate the fields in the SQL queries.

It should be noted that despite this constraint, it is possible to perform a great many queries, in that the privileged table concept covers the notion of a real table but also the notion of a virtual or view table resulting from another query, notably in SQL or formulated from the input module in the initial format.

The references made to the relationships between the fields of tables from the name given to the relationships allow the formulation of the queries to be simplified by using implicit joins between the tables, whereas the syntax of SQL does not allow such references to be integrated into SQL queries because, in contrast, SQL requires that the joins be explicitly indicated.

It is therefore possible to filter data on the basis of information contained in another table by two different means.

Advantageously, the language used for the initial input is enriched to deal with more complex cases and offer more compact and readable entries compared with SQL syntax and the conversion module is capable of carrying out the conversion to SQL syntax.

Thus, for example, sets of cumulative or alternative conditions are defined for conversion in the form of successive conditions separated by AND or OR.

Moreover, it is possible to enrich the interrogation language by introducing new operators which are themselves constructed from queries written with the interrogation means described. In the example below, the operator "similar" is introduced which allows two equivalent products to be identified: two products X and Y are regarded as equivalent if the identifier of a product Y is present in the Equivalent field of a product X.

The definition of the SIMILAR operator is therefore written as follows:

```
Operator: ?X SIMILAR ?Y
Table: Product
Filter: ProdId = ?X AND Equivalent = ?Y OR ProdId =
?Y AND Equivalent = ?X
    SQL query SELECT * FROM Products WHERE ProdId = ?X AND Equivalent =
?Y OR ProdId = ?Y AND Equivalent = ?X
```

The products are considered equivalent if the above query returns at least one record. It should be noted that the Fields part of the query is not filled in because, to define a new operator, only the fact that the query can return at least one record for a given=?X and ?Y pair is relevant.

Once such an operator has been defined the following entry can be used to input the query which returns the names of customers and the quantities of products similar to the "IdA" product purchased by customers in the construction sector:

```
Input query

Table: Purchases
Fields: Name.Customer, Quantity
Filter: Product SIMILAR "IdA" AND Customer.Company.Sector =
    "Construction"
    SQL query SELECT Customers.Name, Purchases.Quantity FROM Purchases,
Customers, Companies WHERE Purchases.Customer =
Customers.CustomerId AND
    Customers.Company = Companies.CompId AND Companies.Sector =
"Construction" AND EXISTS (SELECT * FROM Products
WHERE ProdId = Purchases.Product AND Equivalent =
"IdA" OR ProdId = "IdA" AND Equivalent =
Purchases.Product)
```

When defining an operator involving fields from several tables, the input module and its associated conversion module may be used to predefine join diagrams between reusable tables, which would be very difficult to put in place with SQL given the complexity of its syntax.

In addition, the description of the operator may also be deduced from a query formulated directly in SQL using a similar method.

Finally, it is possible to use these interrogation means to modify data (for example modifying fields or deleting records) over a data perimeter represented by a query expressed in the format of the invention. In the example below there is no need for the "Fields" part and it is replaced by "Action" which describes the required data changes.

To change the status of all customers who have made at least two product purchases for which the price is greater than 100 and for which the company sector is construction to "large":

```
Input query

Table: Customers
Action: Large = "Yes"
Filter: PurchasesRef.Count{Product.Price >= 100} >= 2 AND
Company.Sector = "Construction".
    SQL query UPDATE Customers SET Large = "Yes" WHERE (SELECT Count(*)
FROM Purchases, Products WHERE Purchases.Product = Products.ProdId
AND Products.Price >= 100 AND Purchases.Customer =
Customers.CustomerId) >= 2 AND Company IN (SELECT
CompId FROM Companies WHERE Sector = "Construction")
```

The invention claimed is:

1. A method of interrogating or modifying a database that includes a plurality of tables, each with fields, and relationships between the fields of various tables, the method comprising the steps of:
creating an initial query in an initial format that includes solely:
a single privileged table,
at least one input field in another table, different from said privileged table, for which data are sought or to be modified, and
at least one input filter pertaining to a field of another table, different from said privileged table, for selection of the data sought or to be modified, the at least one input filter including an identification of at least one field;
converting said initial query into a full SQL request in an appropriate SQL format by, based on knowledge of the relationships between the fields of the various tables in the database established from a data model of the database, performing the sub-steps of:
identifying, using the at least one input field and the at least one field associated with the at least one input filter, tables in the database containing these fields,
identifying, using the at least one input field and the at least one field associated with the at least one input filter, relationships in the database between these fields, and
formulating, from said initial query, said identified tables, and said identified relationships, a full SQL query to the database by stating in full:
fields for which data are sought or to be modified,
one or more filters, including said at least one input field and/or field(s) associated with the at least one input filter, and including said identified tables containing these fields in accordance with said identified relationships, and
joins representative of said identified relationships between the fields of various tables; and
applying said full SQL query to the database.

2. The method according to claim 1, wherein a relationship to another table is implicitly input in a filter by using the name of a field used by a join in the case of a "many to one" relationship.

3. The method according to claim 2, wherein the relationship to another table is input in the filter using a formulation containing the form: sourcefield.destinationfield to designate the fields in a table other than the input table, where sourcefield is the field in the source table and destinationfield is the field in the destination table in the case of a "many to one" relationship.

4. The method according to claim 1, wherein a relationship to another table is input in the filter using a name previously assigned to the relationship in the database data model in the case of a "one to many" relationship.

5. The method according to claim 1, wherein a nested filtering conditions are input as filter variables identified by predetermined syntax, but the filter variables do not explicitly mention the joins representative of the relationships between the fields of the various tables.

6. The method according to claim 1, wherein the filter comprises at least one field comparison operator which may be combined by AND/OR operators.

7. The method according to claim 1, wherein the filter comprises at least one calculation operator on a field.

8. The method according to claim 1, wherein the filter comprises a new operator for enriching the interrogation language, said new operator being defined beforehand by filling in a privileged table and at least one filter.

9. The method according to claim 1, wherein the input of filters allowing the data sought to be selected is free of an explicit mention of the joins representative of the relationships between the fields of the various tables.

10. The method according to claim 1, wherein the initial query is in a non-SQL format.

11. A non-transitory computer readable medium having recorded thereon a computer program/product for interrogating or modifying a database having a plurality of tables, each with fields, and relationships between the fields of various tables, said computer program/product, when executed on a computer, causes the computer to execute the steps of:
   creating an initial query in an initial format that is limited to:
      a single privileged table,
      one or more input fields in another table, different from said privileged table, for which data are sought or to be modified, and
      one or more input filters pertaining to a field of another table, different from said privileged table, allowing the selection of the data sought or to be modified;
   converting said initial query into a full SQL request in an appropriate SQL format by, based on knowledge of the relationships between the fields of the various tables in the database established from a data model of the database, performing the sub-steps of:
      identifying in the database, using the one or more input fields and fields identified with the one or more input filters, tables in the database containing these fields,
      identifying in the database, using the one or more input fields and fields identified with the one or more input filters, relationships in the database between these fields, and
      formulating, from said initial query, the full SQL request by stating in full:
         fields for which data are sought or to be modified,
         one or more filters, including said at least one input field and/or field(s) associated with the at least one input filter, and including said identified tables containing these fields in accordance with said identified relationships, and
         joins representative of said identified relationships between the fields of various tables; and
   applying the full SQL request to the database.

12. A method of interrogating or modifying a database stored on a storage medium connectable to a processing device, the database including a plurality of tables, each with associated fields, at least two of the fields of the tables being related to each other by way of a relationship, the method comprising the steps of:
   at the processing device, storing within a memory device a data model that includes information concerning relationships between the fields and the tables of the database, and information concerning the join fields representative of the relationships between the fields and the tables of the database;
   at the processing device, receiving an initial query in a non-SQL format, the initial query formed of three input parameters: a single privileged table, at least one input field in another table, different from said privileged table, from which data are sought or to be modified, and at least one input filter pertaining to a field of another table, different from said privileged table, for selection of the data sought or to be modified, the at least one input filter identifying a filter field as a field of the database upon which the filter is to be applied;
   at the processing device, using said stored data model to convert said initial query into a full SQL request in SQL format by performing the sub-steps of:
   identifying tables in the database that contain the at least one input field and the filter field of the at least one input filter, identifying relationships in the database associated with the at least one input field and the filter field of the at least one input filter, and assembling, from said initial query, said identified tables, and said identified relationships, a full SQL query to the database that includes, in full: all fields for which data are sought or to be modified by the initial query, one or more filters, at least one of said filters including an identification of said filter field and an identified table associated with said filter field, and one or more joins representative of the identified relationships, including identifications of fields and identified tables associated with the identified relationships, wherein said full SQL query is sufficient to query the database and operate upon the data sought or to be modified.

* * * * *